(12) United States Patent
Endo

(10) Patent No.: US 10,303,565 B2
(45) Date of Patent: May 28, 2019

(54) MULTICASTING SYSTEM VOTING ON SERVER DATA

(71) Applicants: KABUSHIKI KAISHA TOSHIBA, Tokyo (JP); TOSHIBA SOLUTIONS CORPORATION, Kanagawa (JP)

(72) Inventor: Kotaro Endo, Tokyo (JP)

(73) Assignees: Kabushiki Kaisha Toshiba, Tokyo (JP); Toshiba Solutions Corporation, Kanagawa (JP)

( * ) Notice: Subject to any disclaimer, the term of this patent is extended or adjusted under 35 U.S.C. 154(b) by 149 days.

(21) Appl. No.: 15/265,568

(22) Filed: Sep. 14, 2016

(65) Prior Publication Data

US 2017/0004029 A1     Jan. 5, 2017

Related U.S. Application Data

(63) Continuation of application No. PCT/JP2014/057418, filed on Mar. 18, 2014.

(51) Int. Cl.
  *G06F 11/07* (2006.01)
  *G06F 11/16* (2006.01)
  *G06F 11/18* (2006.01)

(52) U.S. Cl.
  CPC ...... *G06F 11/1608* (2013.01); *G06F 11/0709* (2013.01); *G06F 11/0787* (2013.01);
  (Continued)

(58) Field of Classification Search
  CPC ............ G06F 11/1608; G06F 11/1616; G06F 11/1629; G06F 11/1633; G06F 11/1637;
  (Continued)

(56) References Cited

U.S. PATENT DOCUMENTS 4,907,232 A * 3/1990 Harper .................... G06F 11/18
                                                                714/11
5,598,529 A    1/1997 Garay et al.
(Continued)

FOREIGN PATENT DOCUMENTS

CN    101576835 B  * 12/2010  .............. G06F 11/18
JP       2534430         9/1996
(Continued)

OTHER PUBLICATIONS

Zookeeper: A Distributed Coordination Service for Distributed Applications (Sep. 24, 2012). Retrieved from http://zookeeper.apache.org/doc/current/zookeeperOver.html.
(Continued)

*Primary Examiner* — Gabriel Chu
(74) *Attorney, Agent, or Firm* — Finnegan, Henderson, Farabow, Garrett & Dunner, L.L.P.

(57) ABSTRACT

An information processing system includes a first determining unit, a second determining unit, and a processing unit. The first determining unit determines a result indicating a second fixed state for data when a first condition is satisfied, the first condition indicating that t2 or more results of a first recommended state or a first fixed state are selected for the same data. The second determining unit determines the result indicating the first fixed state for the data when a second condition is satisfied, the second condition indicating that t1 or more results indicating the second fixed state are selected for the same data. The second determining unit also determines the result indicating the first recommended state for the data when a third condition is satisfied, the third condition indicating that (b+1) or more results indicating the second fixed state are selected for the same data.

15 Claims, 7 Drawing Sheets

(52) U.S. Cl.
CPC .......... *G06F 11/1637* (2013.01); *G06F 11/18* (2013.01); *G06F 11/182* (2013.01)

(58) Field of Classification Search
CPC ............. G06F 11/1641; G06F 11/1645; G06F 11/165; G06F 11/167; G06F 11/18; G06F 11/181; G06F 11/182; G06F 11/183; G06F 11/184; G06F 11/185; G06F 11/186; G06F 11/187
See application file for complete search history.

(56) References Cited

U.S. PATENT DOCUMENTS

| | | | |
|---|---|---|---|
| 6,178,522 B1 | 1/2001 | Zhou et al. | |
| 6,567,927 B1 | 5/2003 | Brinkmann | |
| 7,272,632 B2 | 9/2007 | Endo | |
| 8,984,330 B2* | 3/2015 | Goose | G06F 11/1484 714/2 |
| 2001/0039630 A1* | 11/2001 | Kursawe | G06F 11/182 714/4.1 |
| 2002/0194276 A1 | 12/2002 | Endo | |
| 2007/0043888 A1 | 2/2007 | Suzuki et al. | |
| 2007/0214355 A1* | 9/2007 | Lamport | G06F 11/182 713/156 |
| 2010/0017644 A1* | 1/2010 | Butterworth | G06F 11/1658 714/4.1 |
| 2011/0302449 A1* | 12/2011 | Douceur | G06F 11/187 714/15 |
| 2016/0191676 A1 | 6/2016 | Endo | |

FOREIGN PATENT DOCUMENTS

| | | |
|---|---|---|
| JP | 2000-330811 | 11/2000 |
| JP | 2005-71247 | 3/2005 |
| JP | 3655263 | 6/2005 |
| JP | 2010-198442 | 9/2010 |

OTHER PUBLICATIONS

International Search Report issued by the Japanese Patent Office in International Application No. PCT/JP2014/057418, dated Jun. 17, 2014 (2 pages).

Siu et al., "Byzantine Agreement in the Presence of Mixed Faults on Processors and Links," IEEE Transactions on Parallel and Distributed Systems (Apr. 1998), pp. 335-345.

Yoshino et al., "Hierarchical Protocol for Byzantine Agreement," IPSJ SIG Technical Report (Jun. 3, 2004), pp. 37-42.

\* cited by examiner

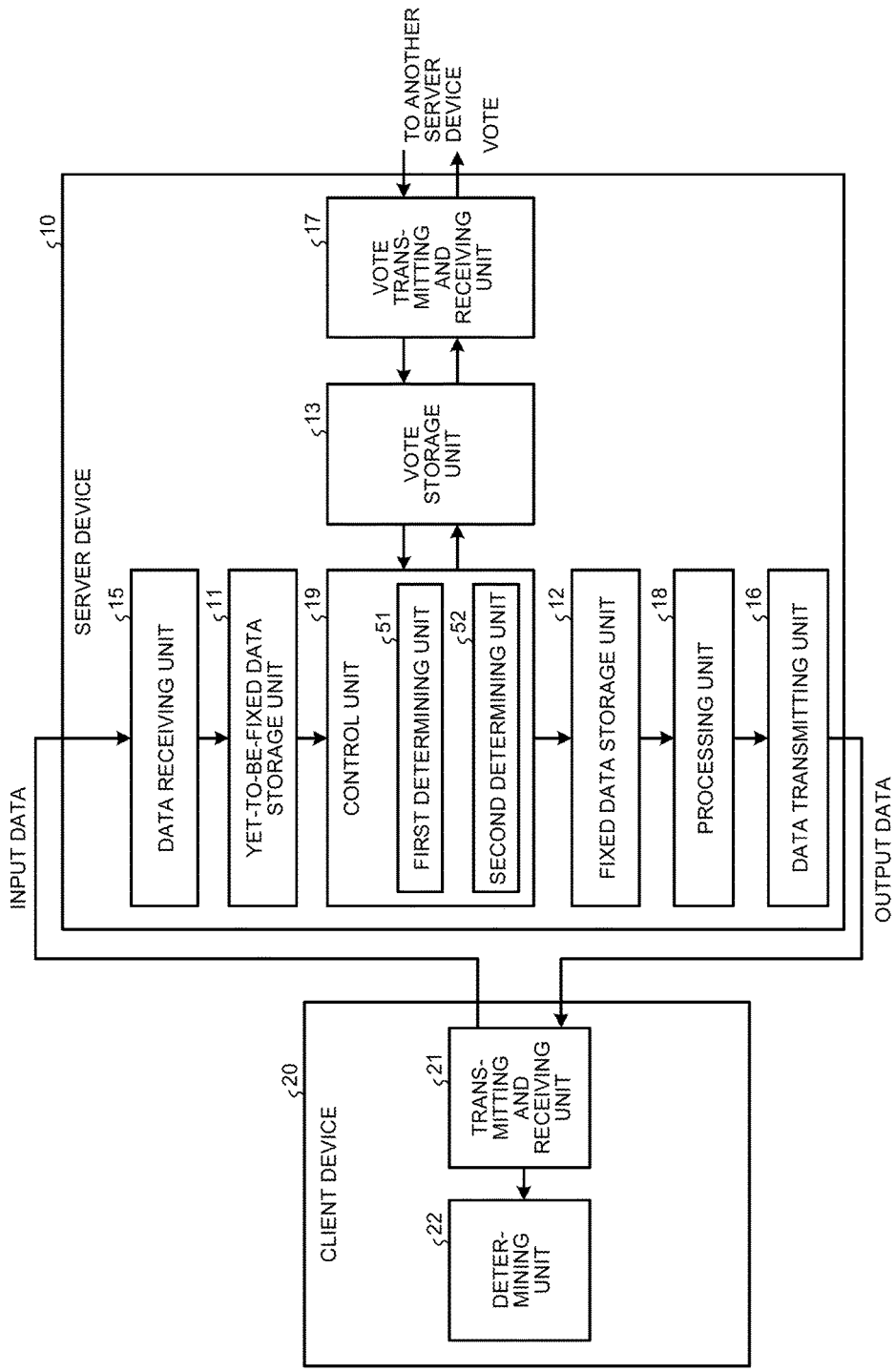

FIG.3

| ORDER NUMBER | ROUND NUMBER | NODE 1 | NODE 2 | NODE 3 | NODE 4 | NODE 5 | NODE 6 |
|---|---|---|---|---|---|---|---|
| ... | ... | ... | ... | ... | ... | ... | ... |
| s | 1 | A RECOMMENDED | B RECOMMENDED | C RECOMMENDED | D RECOMMENDED | E RECOMMENDED | F RECOMMENDED |
| s | 2 | D WAITING | B WAITING | B WAITING | D TO-BE-ELECTED | A WAITING | E WAITING |
| s | 3 | B RECOMMENDED | B RECOMMENDED | B RECOMMENDED | D RECOMMENDED | D RECOMMENDED | B RECOMMENDED |
| s | 4 | B TO-BE-ELECTED | B TO-BE-ELECTED | B TO-BE-ELECTED | A TO-BE-ELECTED | D WAITING | B TO-BE-ELECTED |
| s | 5 | B RECOMMENDED | B ELECTED | B ELECTED | A RECOMMENDED | B RECOMMENDED | B RECOMMENDED |
| s | 6 | B TO-BE-ELECTED | [B TO-BE-ELECTED] | [B TO-BE-ELECTED] | D WAITING | B TO-BE-ELECTED | B TO-BE-ELECTED |
| s | 7 | B ELECTED | [B ELECTED] | [B ELECTED] | D ELECTED | B ELECTED | B ELECTED |
| s+1 | 1 | A RECOMMENDED | G RECOMMENDED | C RECOMMENDED | A RECOMMENDED | E RECOMMENDED | F RECOMMENDED |
| ... | ... | ... | ... | ... | ... | ... | ... |

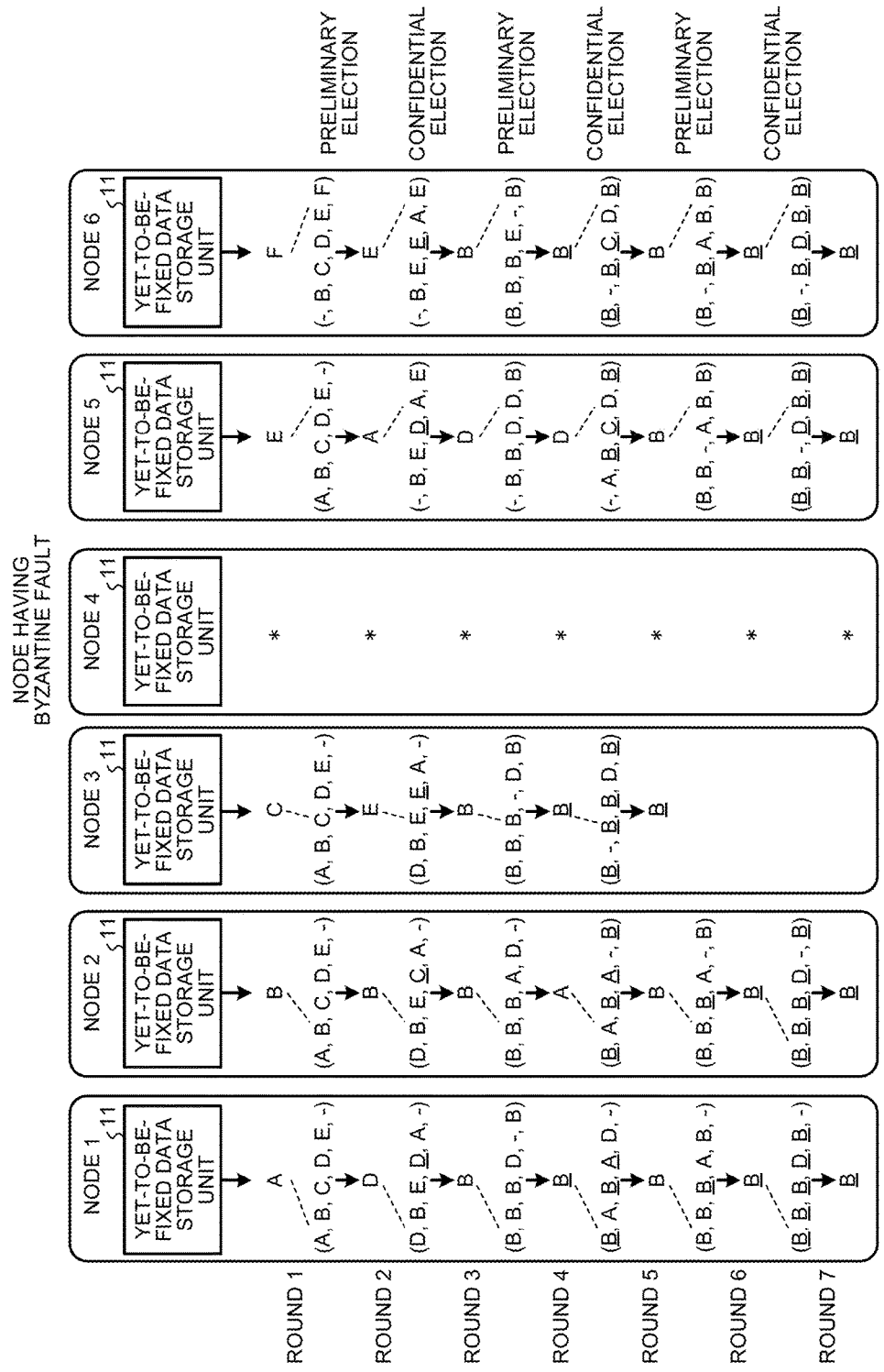

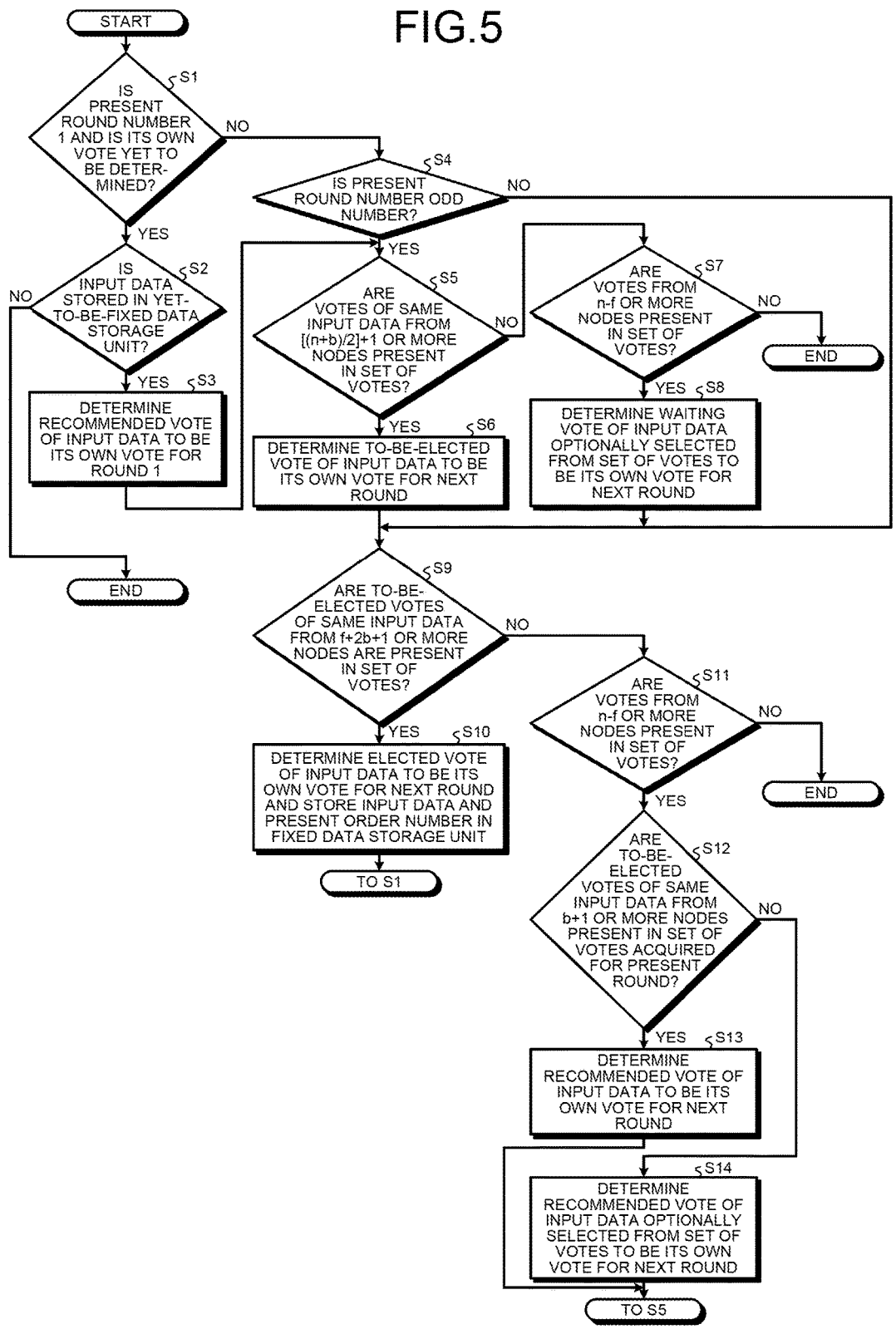

MULTICASTING SYSTEM VOTING ON SERVER DATA

CROSS-REFERENCE TO RELATED APPLICATIONS

This application is a continuation of PCT international application Ser. No. PCT/JP2014/057418 filed on Mar. 18, 2014, the entire contents of which are incorporated herein by reference.

FIELD

Embodiments described herein relate generally to an information processing system, a server device, an information processing method, and a computer program product.

BACKGROUND

Multiplexing systems that cause a plurality of nodes to perform same processing in a multiplexing manner have been in practical use as a method for improving the availability and the reliability. The multiplexing systems have high availability because, when a part of the nodes have a stop fault, the other part thereof can continue the processing. The multiplexing systems have high reliability by comparing processing results output from the respective nodes and excluding a wrong result.

Some types of multiplexing systems are known, including a system that multiplexes dedicated computers of the same model arranged side by side. In this system, communications between the computers are stable, and the execution speeds of the computers are substantially equal to each other. In a case where a delay longer than a predetermined time occurs in one of the computers, the delay should be considered as a stop fault. Such an environment is classified as a synchronous network model.

The synchronous network model can detect a stop fault using time-out of a relatively short time. Duplexing systems that employ this mechanism are widely and generally used. Examples of the duplexing systems include, but are not limited to, high-availability (HA) systems, fault tolerant (FT) servers, etc. Furthermore, triplexing systems that employ a majority decision on output results are also in practical use.

With the development of the Internet, practically used are systems including a plurality of computers that operate in association with one another via the Internet. Servers provided by virtual machines are also widely used. A typical example of the systems is what is called a cloud system. Since an environment highly distributed and virtualized on a network frequently has temporary network delay and retardation in execution of computers, the delay and retardation should not be considered as a stop fault. Such an environment is classified as an asynchronous network model.

Under the asynchronous network model you can not consider delay as a stop fault when a node temporarily stops operating. As a result, under the asynchronous network model you can not detect a stop fault with time-out of a relatively short time. To maintain the consistency of multiplexing without detecting a stop failure, the asynchronous network model requires more operating nodes than those of the synchronous network model.

In a system serving as an asynchronous network model and employing a majority decision on output results, the output results required for the majority decision are asynchronously supplied. Especially when the number of operating nodes is large, the system needs to prevent the processing from being delayed until necessary information (output results) is supplied.

BRIEF DESCRIPTION OF THE DRAWINGS

FIG. 2 is a block diagram of an exemplary configuration of a client device and a server device according to the first embodiment;

FIG. 3 is a diagram of an exemplary data structure of data stored in a vote storage unit;

FIG. 4 is a diagram for explaining an exemplary operation of ordered multicasting;

FIG. 5 is a flowchart of the entire flow of ordered multicasting according to the first embodiment;

DETAILED DESCRIPTION

Figure 1:
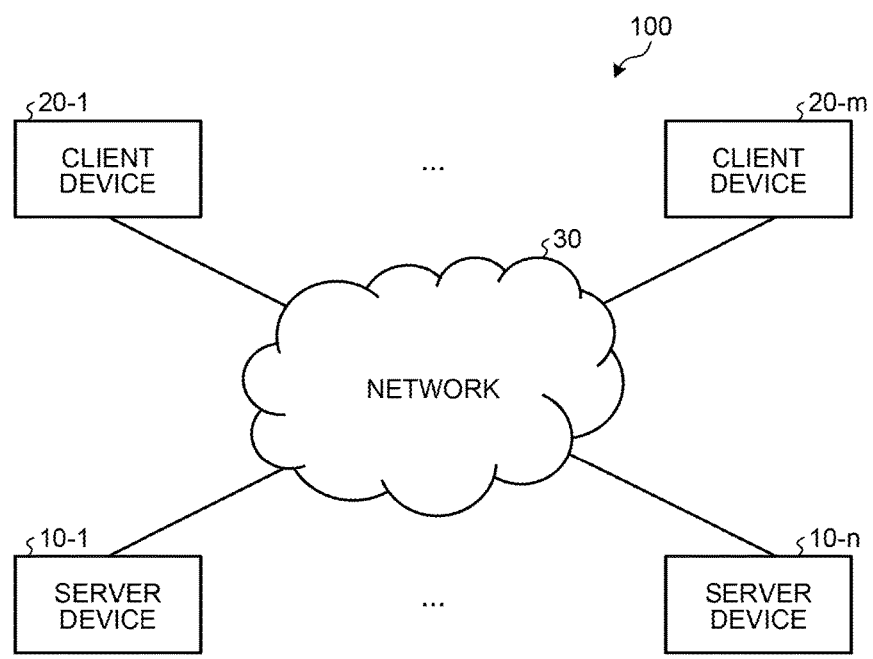
FIG. 1 a block diagram of an exemplary configuration of an information processing system according to a first embodiment.

According to an embodiment, an information processing system includes a first determining unit, a second determining unit, and a processing unit. The first determining unit determines a result indicating a second fixed state for data when a first condition is satisfied, the first condition indicating that t2 or more results of a first recommended state or a first fixed state are selected for the same data. The second determining unit determines the result indicating the first fixed state for the data when a second condition is satisfied, the second condition indicating that t1 or more results indicating the second fixed state are selected for the same data. The second determining unit also determines the result indicating the first recommended state for the data when a third condition is satisfied, the third condition indicating that (b+1) or more results indicating the second fixed state are selected for the same data.

Exemplary embodiments of an information processing system, a server device, an information processing method, and a computer program product according to the present invention are described below in greater detail with reference to the accompanying drawings. The embodiments are not intended to limit the present invention.

Definitions of Terms

Definitions of terms used in the embodiments below are described first.

An independent computer included in a distributed system (information processing system) is referred to as a "node". Nodes are independently provided and can perform communications therebetween via a network. A state where the node does not operate at all is referred to as a "stop fault". A state where the node is malfunctioning is referred to as a "Byzantine fault". The stop fault and the Byzantine fault are collectively referred to as a "node fault". A node having no node fault is referred to as an "operating node". A node having no Byzantine fault is referred to as a "normal node". The operating node is always a normal node. The stop fault does not include the Byzantine fault by definition. The behavior of malfunction in the Byzantine fault is arbitrary and include malfunction caused by unauthorized access.

In view of the availability of a multiplexing system, the availability is calculated from the MTBF and MTTR of the service provided by the system serves. Let us assume a case where a stop fault occurs in a main system of a typical HA system, for example. In this case, the HA system provides no service until a sub system detects the stop fault with time-out and resumes the service. In a method for detecting a stop fault using time-out, a time for the time-out is generally set to as a short time as possible to decrease the MTTR. If the time for the time-out is made extremely short, however, a stop fault may possibly be erroneously detected, resulting in reduced reliability and availability on the contrary. Some types of fundamental solutions for the problem are known, including non-blocking multiplexing that can secure real-time property even when a fault occurs. The non-blocking multiplexing need not perform fault detection, thereby preventing the processing from being interrupted when a fault occurs. As a result, the availability is not lowered by time-out.

In view of the reliability of a multiplexing system, a multiplexing system having a tolerance to a Byzantine fault is more reliable. To have a tolerance to a Byzantine fault while maintaining the consistency of multiplexing, however, the multiplexing system requires more operating nodes. There has been developed a multiplexing technique on the assumption of a synchronous network model that satisfies n>f+2b where n is the number of all nodes, f is the maximum permissible number of node faults, and b is the maximum permissible number of Byzantine faults, for example.

First Embodiment

As described above, especially when the number of operating nodes is large, it is necessary to prevent the processing from being delayed until necessary information (output results) is supplied. An information processing system according to the present embodiment performs multiplexing control having a tolerance to at least a Byzantine fault and consistency on the assumption of an asynchronous network model and that can suppress delay of the processing. The present embodiment can also perform non-blocking multiplexing that secures real-time property when a fault occurs.

In a multiplexing system according to the present embodiment, all the nodes included in the multiplexing system are provided in the same initial state. Data received by the nodes are transmitted to the nodes by ordered multicasting. Based on the received data, the nodes execute a deterministic computer program. As a result, the nodes output data.

In this system, the nodes are provided in the same initial state, the input queues to the nodes are put into the same order by ordered multicasting, the states of the nodes are kept the same by the characteristics of the deterministic computer program, and the output queues are made the same. As a result, the computer programs are performed in a multiplexing manner.

In the information processing system according to the present embodiment assumed to be an asynchronous network model, if the number of computers having a Byzantine fault is equal to or smaller than b (the maximum number of Byzantine faults), valid output data acquired from the multiplexing system is proper. Furthermore, if the number of node faults is equal to or smaller than f (the maximum permissible number of node faults), the multiplexing system can continue the processing.

The information processing system according to the present embodiment can set f corresponding to the threshold of the availability separately from b corresponding to the threshold of the reliability. By setting f to a value larger than b, the information processing system can permit f-b stop faults even if the number of Byzantine faults reaches b. This setting is suitably used for a system in which the availability is relatively important. By contrast, by setting b to a value larger than f, the information processing system does not malfunction if the number of Byzantine faults does not exceed b after the number of node faults exceeds f. This setting is suitably used for a system that should stop instead of malfunctioning (what is called a fail stop system).

Since an asynchronous network model is assumed, the multiplexing system can be configured without any problem even if the nodes are virtual servers in a cloud system or mobile devices such as mobile phones besides what are called server computers, for example. The multiplexing system need not perform fault detection, thereby preventing the processing from being interrupted when a fault occurs. As a result, a lowered availability caused by time-out does not occur, and the multiplexing system is also applicable to a system that requires real-time property.

The information processing system according to the present embodiment performs ordered multicasting for determining input data and an order by repeating a plurality of elections. An election means processing for determining, from input data for a certain round, input data for the next round. The election includes a preliminary election and a confidential election conducted using data voted in the preliminary election. "Voting" means selecting data and a state corresponding to the data in each election. Data on a result of voting may hereinafter be referred to as a "vote".

The present embodiment sequentially assigns order numbers from 1 to queues of input data the order of which is fixed by ordered multicasting. Rounds are sequentially assigned with round numbers from 1. When the input data is fixed, the round number is reset to 1. In other words, the rounds are each uniquely identified by a group of "the order number and the round number".

Information determined by voting is a group of "the order number, the round number, a node number, a selection result (selected state), and input data". The node number is a number for identifying a node that performs voting. The node number may be information (node identification information) other than a numerical value (number) as long as it can identify a node. The selection result is any one of four types of states of a recommended state (first recommended state), an elected state (first fixed state), a waiting state (second recommended state), and a to-be-elected state (second fixed state). Votes by which the waiting state, the to-be-elected state, the recommended state, and the elected state are selected may be hereinafter referred to as a waiting vote, a to-be-elected vote, a recommended vote, and an elected vote, respectively.

The waiting state is a state of being selected not as candidate data to be fixed but as data to be recommended in the preliminary election. The to-be-elected state is a state of being selected as candidate data to be fixed in the preliminary election. The recommended state is a state of being selected not as data to be fixed but as data to be recommended in the confidential election. The elected state is a state of being selected as data to be fixed in the preliminary election.

The preliminary election and the confidential election are alternately conducted. The round number of data used for the preliminary election is an odd number, whereas the round number of data used for the confidential election is an even number.

FIG. 1 a block diagram of an exemplary configuration of an information processing system 100 according to the first embodiment. As illustrated in FIG. 1, the information processing system 100 includes server devices 10-1, ..., 10-*n* (n is an integer of 4 or larger), client devices 20-1, ..., 20-*m* (m is an integer of 1 or larger), and a network 30. The server devices 10-1, 10-*n* are hereinafter simply referred to as a server device 10 when they need not be distinguished. The client devices 20-1, ..., 20-*m* are hereinafter simply referred to as a client device 20 when they need not be distinguished. The server device 10 corresponds to the node described above included in the distributed system.

The server device 10 and the client device 20 are connected via the network 30 so as to perform communications with each other. The server device 10 and another server device 10 are connected via the network 30 so as to perform communications with each other. The communication system between the devices may be a wired or a wireless system or a combination thereof. The communications between a plurality of server devices 10 are performed more frequently than the communications between the client device 20 and the server device 10. The communications between the server devices 10 may be performed via another higher-speed line.

FIG. 2 is a block diagram of an exemplary configuration of the client device 20 and the server device 10 according to the first embodiment. The client device 20 includes a transmitting and receiving unit 21 and a determining unit 22.

The transmitting and receiving unit 21 transmits input data to the server devices 10 and receives an output packet including output data from the server devices 10. The determining unit 22 stores therein the output packet received by the transmitting and receiving unit 21 from the server devices 10 and determines the validity of the output data.

The server device 10 includes an yet-to-be-fixed data storage unit 11, a fixed data storage unit 12, a vote storage unit 13, a data receiving unit 15, a data transmitting unit 16, a vote transmitting and receiving unit 17, a processing unit 18, and a control unit 19.

The data receiving unit 15 receives data transmitted from an external device, such as the client device 20. The data receiving unit 15 receives input data from the client device 20, for example.

The yet-to-be-fixed data storage unit 11 stores therein input data received by the data receiving unit 15 from the client device 20. The fixed data storage unit 12 stores therein input data the order of which is fixed by the control unit 19 in a manner associated with the order number indicating the determined order. If input data the order of which is fixed is stored in the yet-to-be-fixed data storage unit 11, the stored input data is deleted from the yet-to-be-fixed data storage unit 11.

The vote transmitting and receiving unit 17 transmits and receives a result of voting (selection result) to and from another server device 10. The vote transmitting and receiving unit 17 receives a vote from another server device 10, for example.

The vote storage unit 13 stores therein a vote of another server device 10 acquired via the vote transmitting and receiving unit 17 and its own vote determined by the control unit 19. Its own vote is determined by the control unit 19 in the device itself. Its own vote stored in the vote storage unit 13 is transmitted to another server device 10 via the vote transmitting and receiving unit 17 as needed.

The processing unit 18 sequentially reads the order number and the input data from the fixed data storage unit 12. The processing unit 18 performs predetermined processing using the input data as an input, thereby outputting an output result (output data). The number of pieces of input data used for the predetermined processing is a desired number. One or a plurality of pieces of input data, for example, are used for the predetermined processing in accordance with the order number. The number of pieces of output data output by the predetermined processing is also a desired number. The output data is usually assigned with an order number (output order number) different from the order number of the input data.

The data transmitting unit 16 transmits data to an external device, such as the client device 20. The data transmitting unit 16 puts the output data output by the processing unit 18 into an output packet, for example, and transmits it to the transmitting and receiving unit 21 of the client device 20. The output packet has a format of a group of "the output order number, the node number, the output data", for example.

The determining unit 22 of the client device 20 retains the output order number (present output order number) of output data to be subsequently fixed. If the determining unit 22 receives output packets having the present output order number and the same output data from b+1 or more nodes, for example, the determining unit 22 determines the output data to be valid data and increments the present output order number by 1.

The control unit 19 of the server device 10 controls an election using data of each round. The control unit 19 retains the order number (present order number) of input data to be subsequently fixed and the round number (present round number) of the round in which an election is being conducted. The round corresponding to the present order number and the present round number is referred to as a present round. If the present round number is 1, the control unit 19 reads input data from the yet-to-be-fixed data storage unit 11, determines its own vote to be a recommended vote for the round 1, and stores it in the vote storage unit 13.

The control unit 19 reads votes stored in the vote storage unit 13 and conducts a preliminary election or a confidential election on the present round. The control unit 19 determines its own vote in the next round, stores it in the vote storage unit 13, and increments the present round number by 1. If the result of the confidential election is an elected state, the control unit 19 stores the input data and the present order number in the fixed data storage unit 12, increments the present order number by 1, and sets the present round number to 1.

The control unit 19 includes a first determining unit 51 and a second determining unit 52. The first determining unit 51 conducts a preliminary election (first determination processing). The second determining unit 52 conducts a confidential election (second determination processing).

The preliminary election is conducted as follows: if a majority of (nib) (=[(n+b)/2]+1) or more votes of a recommended state or an elected state are received for the same data in voting of the present round (first condition), for example, a to-be-elected state is voted for the data in voting of the next round.

The confidential election is conducted as follows: if (f+2b+1) or more votes of a to-be-elected state are received for the same data in voting of the present round (second condition), for example, an elected state is voted for the data; and if the second condition is not satisfied and if (b+1) or more votes of a to-be-elected state are received for the same data (third condition), a recommended state is voted for the data.

To perform non-blocking multiplexing, the preliminary election and the confidential election may be conducted as follows. If the first condition is not satisfied in the preliminary election, for example, a waiting state may be voted for arbitrarily (e.g., randomly) selected data at a timing when (n-f) or more votes are received (fourth condition). If the second condition is not satisfied, but the third condition is satisfied in the confidential election, a recommended state may be voted for the data at a timing when (n-f) or more votes are received. If neither the second condition nor the third condition is satisfied in the confidential election, a recommended state may be voted for arbitrarily (e.g., randomly) selected data at a timing when (n-f) or more votes are received (fifth condition).

Its own vote on each round should not be overturned once it is determined. In other words, if its own vote is already determined, another voting is not carried out (prohibition on double voting). Specifically, votes of the respective nodes in an odd round are one of a recommended vote and an elected vote, whereas votes of the respective nodes in an even round are one of a waiting vote and a to-be-elected vote.

FIG. 3 is a diagram of an exemplary data structure of data stored in the vote storage unit 13. In the example illustrated FIG. 3, the number of nodes n is 6. The vote storage unit 13 stores therein input data and a voting state in a manner associated with the order number, the round number, and the node number.

In the example illustrated in FIG. 3, A to G correspond to input data. If an elected vote of certain input data is present in an order number, a subsequent round in the order number is assumed to receive a to-be-elected vote or an elected vote of the input data from a corresponding node in a pseudo manner. In the example illustrated in FIG. 3, an elected vote for input data B is received from a node 2 and a node 3 in a round 5 of an order number s. A round 6 of the order number s is assumed to receive a to-be-elected vote for the input data B, and a round 7 thereof is assumed to receive an elected vote for the input data B.

The yet-to-be-fixed data storage unit 11, the fixed data storage unit 12, and the vote storage unit 13 may be provided as various types of generally used storage media, such as a hard disk drive (HDD), an optical disc, a memory card, and a random access memory (RAM).

The following describes a specific example of an operation of ordered multicasting. FIG. 4 is a diagram for explaining an exemplary operation of ordered multicasting. In this example, n is set to 6, f is set to 1, and b is set to 1. In this case, [(n+b)/2]+1=4, f+2b+1=4, n-f=5 are satisfied. In the following description, six server devices 10 are also referred to as nodes 1 to 6. The node 4 has a Byzantine fault.

In FIG. 4, A to F denote input data. A to F with no underline denote a recommended vote or a waiting vote, whereas A to F with an underline denote an elected vote or a to-be-elected vote. Whether a vote is a recommended vote or a waiting vote and whether a vote is an elected vote or a to-be-elected vote can be distinguished based on whether the round number is an odd number or an even number. In FIG. 4, a set in parentheses is a set of votes used for an election. A symbol "-" denotes a vote not used for an election. Not all the votes are used for an election because an election is conducted when the number of acquired votes reaches a required number.

The following describes a flow of ordered multicasting.

Let us assume a case where the input data A to F are stored in the yet-to-be-fixed data storage unit 11 of the nodes when input data of the order number is to be determined. The input data corresponds to input data of the nodes for voting in the round 1. This rule is not applied to the node 4 having a Byzantine fault (the same hereinafter).

The nodes acquire vote data for the round 1. The maximum number of votes required for a preliminary election is n-f=5. The node 1 acquires votes of the nodes 2 to 5. While the node 1 acquires five votes including its own vote, four ([(n+b)/2]+1=4) votes of the same input data are not present. As a result, the node 1 randomly selects the input data D as a waiting vote for the round 2. Similarly, the other normal nodes also acquire five votes, but four votes of the same input data are not present. As a result, the nodes randomly select input data as a waiting vote for the round 2.

The nodes acquire vote data for the round 2. The maximum number of votes required for a confidential election is n-f=5. The node 1 acquires votes of the nodes 2 to 5. While the node 1 acquires five votes including its own vote, two (b+1=2) or more to-be-elected votes of the same input data are not present. As a result, the node 1 randomly selects the input data B as a recommended vote for the round 3. Similarly, the other normal nodes also acquire five votes, but two to-be-elected votes of the same input data are not present. As a result, the nodes randomly select input data as a recommended vote for the round 3. Note that the node 4 transmits a false to-be-elected vote to the nodes because it has a Byzantine fault.

The nodes acquire vote data for the round 3. The nodes 1, 3, and 6 each acquire four ([(n+b)/2]+1=4) votes of the same input data B, thereby determining the to-be-elected vote of the input data B to be a vote for the round 4. While the node 2 (or the node 5) acquires five votes, four votes of the same input data are not present. As a result, the node 2 (or the node 5) randomly selects the input data A (or D) as a waiting vote for the round 4.

The nodes acquire vote data for the round 4. The nodes 1, 2, 5, and 6 each acquire five votes. In the nodes 1, 2, 5, and 6, four (f+2b+1=4) to-be-elected votes of the same input data are not present, but two (b+1=2) or more to-be-elected votes of the same input data B are present. As a result, the nodes 1, 2, 5, and 6 determine the input data B to be a recommended vote for the round 5. In the node 3, four to-be-elected votes of the same input data B are present. As a result, the node 3 determines the input data B to be an elected vote for the round 5.

The nodes acquire vote data for the round 5. The nodes 1, 2, 5, and 6 each acquire four ([(n+b)/2]+1=4) votes of the same input data B, thereby determining the to-be-elected vote of the input data B to be a vote for the round 6. The node 3 carries out no acquisition or election of votes because it has already casted the elected vote and fixed the input data of the order number.

The nodes acquire vote data for the round 6. The nodes 1, 2, 5, and 6 each have four (f+2b+1=4) to-be-elected votes of the same input data B, thereby determining the input data B to be an elected vote for the round 7. The node 3 carries out no acquisition or election of votes because it has already casted the elected vote and fixed the input data of the order number.

As a result, all the normal nodes determine the same input data B to be the input data of the order number. The input data B is stored in the fixed data storage unit 12 together with the order number. The input data B stored in the yet-to-be-fixed data storage unit 11 of the node 2 is deleted. As described above, the ordered multicasting is performed.

The fixed input data is output to the processing unit 18. The processing unit 18 performs processing using the fixed input data. Output data are output as results of the processing performed by the processing unit 18 of the nodes. The output data are transmitted to the determining unit 22 of the client device 20 via the data transmitting unit 16 and the transmitting and receiving unit 21 as an output packet in a manner associated with the output order number and the node number. When output packets having the same output order number and the same output data are acquired from b+1 or more nodes, the determining unit 22 determines the output data to be valid output data.

The following describes the flow of ordered multicasting in detail. FIG. 5 is a flowchart of the entire flow of ordered multicasting according to the first embodiment. FIG. 5 illustrates processing performed by the control unit 19 (the first determining unit 51 and the second determining unit 52) of the nodes.

The processing illustrated in FIG. 5 is performed as needed when data is received from the client server 20 or another node and when the contents in the yet-to-be-fixed data storage unit 11 and the vote storage unit 13 are changed, for example.

The first determining unit 51 determines whether the present round number is 1 and whether its own vote for the round 1 is yet to be determined (Step S1). If the present round number is 1, and its own vote for the round 1 is yet to be determined (Yes at Step S1), the first determining unit 51 determines whether input data is stored in the yet-to-be-fixed data storage unit 11 (Step S2). If no input data is stored (No at Step S2), the processing is finished. By contrast, if input data is stored (Yes at Step S2), the first determining unit 51 determines a recommended vote of the input data to be its own vote for the round 1 (Step S3).

If the present round number is not 1, or its own vote for the round 1 is already determined (No at Step S1), the control unit 19 determines whether the present round number is an odd number (Step S4). If the present round number is an odd number (Yes at Step S4), the first determining unit 51 determines whether votes of the same input data from $[(n+b)/2]+1$ or more nodes are present in a set of votes acquired for the present round (Step S5). If votes of the same input data from $[(n+b)/2]+1$ or more nodes are present (Yes at Step S5), the first determining unit 51 determines a to-be-elected vote of the input data to be its own vote for the next round (Step S6). The first determining unit 51 increments the present round number by 1.

If votes of the same input data from $[(n+b)/2]+1$ or more nodes are not present (No at Step S5), the first determining unit 51 determines whether votes from (n−f) or more nodes are present in a set of votes acquired for the present round (Step S7). If votes from (n−f) or more nodes are not present (No at Step S7), the processing is finished.

If votes from (n−f) or more nodes are present (Yes at Step S7), the first determining unit 51 determines a waiting vote of input data arbitrarily selected from a set of votes acquired for the present round to be its own vote for the next round (Step S8). The first determining unit 51 increments the present round number by 1.

After Step S6 and Step S8, and if it is determined that the present round number is not an odd number (that is, an even number) at Step S4 (No at Step S4), the second determining unit 52 determines whether to-be-elected votes of the same input data from (f+2b+1) or more nodes are present in a set of votes acquired for the present round (Step S9). If to-be-elected votes of the same input data from (f+2b+1) or more nodes are present (Yes at Step S9), the second determining unit 52 determines an elected vote of the input data to be its own vote for the next round (Step S10). The second determining unit 52 stores the input data and the present order number in the fixed data storage unit 12. The second determining unit 52 increments the present order number by 1 and sets the present round number to 1. Subsequently, the processing is returned to Step S1.

If to-be-elected votes of the same input data from (f+2b+1) or more nodes are not present (No at Step S9), the second determining unit 52 determines whether votes from (n−f) or more nodes are present in a set of votes acquired for the present round (Step S11). If votes from (n−f) or more nodes are not present (No at Step S11), the processing is finished.

If votes from (n−f) or more nodes are present (Yes at Step S11), the second determining unit 52 determines whether to-be-elected votes of the same input data from (b+1) or more nodes are present in a set of votes acquired for the present round (Step 812). If to-be-elected votes of the same input data from (b+1) or more nodes are present (Yes at Step 812), the second determining unit 52 determines a recommended vote of the input data to be its own vote for the next round (Step S13). The second determining unit 52 increments the present round number by 1. Subsequently, the processing is returned to Step S5.

If to-be-elected votes of the same input data from (b+1) or more nodes are not present (No at Step S12), the second determining unit 52 determines a recommended vote of input data arbitrarily selected from a set of votes acquired for the present round to be its own vote for the next round (Step S14). The second determining unit 52 increments the present round number by 1. Subsequently, the processing is returned to Step S5.

The following proves the validity of the algorithm described above. In the following proof, input data included in a vote is also referred to as a value of the vote. A symbol "#" denotes the number of elements of a set. A symbol "∩" denotes a common portion of a set.

Lemma 1

When the number of Byzantine faults is equal to or smaller than b, all the input data of to-be-elected votes of normal nodes for the same round are equal.

Proof

The following proves that the values of to-be-elected votes x and y of two normal nodes for a round r+1 are equal. Ex is a set of votes having the same value as that of x out of votes for a round r used for a preliminary election in which the to-be-elected vote x is determined. Mx is a set of nodes that cast the votes of Ex. Similarly to this, Ey and My are defined for y. Based on the definition of the algorithm:

$$\#(Mx) \geq [(n+b)/2]+1$$

$$\#(My)[(n+b)/2]+1$$

are satisfied. Therefore, $$\#(Mx \cap My)$$

$$\geq \#(Mx)+\#(My)-n$$

$$\geq 2 \times ([(n+b)/2]+1)-n$$

$$\geq 2 \times ((n+b-1)/2+1)-n = b+1$$

is satisfied. Because the common portion of Mx and My is at least b+1, and the number of Byzantine faults is equal to or smaller than b, at least one of them is a normal node. Given z is a vote of the normal node for the round r, z∈Ex∩Ey is satisfied because a vote of a normal node is not overturned. Based on the definition of Ex and Ey, the values of x and z are equal, and the values of y and z are equal. Therefore, the values of x and y are equal.

Q.E.D.

Lemma 2

When the number of Byzantine faults is equal to or smaller than b, all the input data of elected votes of normal nodes for the same round are equal.

Proof

The following proves that the values of elected votes x and y of two normal nodes for a round r+2 are equal. Ex is a set of to-be-elected votes having the same value as that of x out of votes for the round r+1 used for a confidential election in which the elected vote x is determined. Because #(Ex)≥f+2b+1 is satisfied based on the definition of the algorithm, and the number of Byzantine faults is equal to or smaller than b, at least one of them is a vote from a normal node and corresponds to a to-be-elected vote. Given z is the to-be-elected vote, the values of x and z are equal. Similarly to the case of x, ∃w is satisfied where w is a to-be-elected vote of a normal node, and the values of y and w are equal. Because all the values of the to-be-elected votes of the normal nodes for the round r+1 are equal based on Lemma 1, the values of z and w are equal. Therefore, "value of x"="value of z"="value of w"="value of y" is satisfied, and the values of x and y are equal.

Q.E.D.

Lemma 3

When the number of Byzantine faults is equal to or smaller than b, and the elected vote x of a normal node is present, input data of a recommended vote of a normal node for the same round is equal to the input data of x.

Proof

In the following proof, r+2 is the round of the elected vote x, and y is a recommended vote for the round r+2. The following proves that the values of x and y are equal. Ex is a set of to-be-elected votes having the same value as that of x out of votes for the round r+1 used for a confidential election in which x is determined. By contrast, Ey is a set of votes for the round r+1 used for a confidential election in which y is determined. Mx and My are a set of nodes that cast the votes of Ex and Ey, respectively. Based on the definition of the algorithm:

$$\#(Mx) \geq f+2b+1$$

$$\#(My) \geq n-f$$

are satisfied. Therefore, $$\#(Mx \cap My) \geq \#(Mx) + \#(My) - n \geq 2b+1$$

is satisfied. Because the common portion of Mx and My is at least 2b+1, and the number of Byzantine faults is equal to or smaller than b, at least b+1 of them are normal nodes. Because a vote of a normal node is not overturned, Ex and Ey include at least b+1 common votes. Because the common votes are included in Ex, they are to-be-elected votes having the same value as that of x. Therefore, Ey includes b+1 or more to-be-elected votes having the same value as that of x. Based on the definition of algorithm, y should be a recommended vote having the same value as that of x.

Q.E.D.

Lemma 4

A relation of Expression (1) is satisfied between thresholds of the elected state and the to-be-elected state.

$$f+2b+1 \leq [(n+b)/2]+1 \leq n-f-b \quad (1)$$

Proof

In Expression (1), $[(n+b)/2]$ is the largest integer not exceeding $(n+b)/2$, and the square brackets are what are called Gauss' notation. Furthermore, $[(n+b)/2]+1$ is a majority of n+b. Based on the definition of Gauss' notation, relational Expressions (2) and (3) are satisfied:

$$(n+b)/2 \leq [(n+b)/2]+1 \quad (2)$$

$$[(n+b)/2] \leq (n+b)/2 \quad (3)$$

The following proves the left inequality in Expression (1). Because n>2f+3b is satisfied, Expression (4) is satisfied:

$$(n+b)/2 > ((2f+3b)+b)/2 = f+2b \quad (4)$$

Based on Expressions (4) and (2), $f+2b<[(n+b)/2]+1$ is satisfied. Because both sides of this expression are integers, the left inequality in Expression (1) is satisfied.

The following proves the right inequality in Expression (1).

Because n>2f+3b is satisfied, Expression (5) is satisfied:

$$(n-f-b)-(n+b)/2=(n-2f-3b)/2>0$$

which leads to $(n-f-b)>(n+b)/2$ (5)

Based on Expressions (3) and (5), $[(n+b)/2]<n-f-b$ is satisfied. Because both sides of this expression are integers, the right inequality in Expression (1) is satisfied.

Q.E.D.

Lemma 5

When the number of Byzantine faults is equal to or smaller than b, and the elected vote x of a normal node is present, a vote of a normal node for the next round is a to-be-elected vote, and input data thereof is equal to the input data of x.

Proof

The round of x is denoted by r. A vote for the round r is an elected vote or a recommended vote. Based on Lemma 2 and Lemma 3, the value of a vote of a normal node for the round r is equal to the value of x. In other words, all the values of the votes of the normal nodes for the round r are equal. The following proves the vote y for the round r+1 is not a waiting vote by reduction to absurdity.

Reduction to Absurdity

Let us assume a case where the vote y for the round r+1 is a waiting vote. Ey is a set of votes for the round r used for a preliminary election in which y is determined. Because #(Ey)≥n-f is satisfied based on the definition of the algorithm, and the number of Byzantine faults is equal to or smaller than b, at least n-f-b of them are votes of normal nodes. As described above, all the votes have the same value. Because $[(n+b)/2]+1 \leq n-f-b$ is satisfied based on Lemma 4, however, By includes $[(n+b)/2]+1$ or more votes having the same value. This satisfies the condition for selecting a to-be-elected vote in a preliminary election, which is inconsistent with the definition of the algorithm. Therefore, y cannot be a waiting vote. Because y is not a waiting vote, it is a to-be-elected vote. The votes for the round r of the preliminary election in which y is determined include $[(n+b)/2]+1$ or more votes having the same value as that of y. Because $b+1 [(n+b)/2]+1$ is satisfied, at least one of them is a vote of a normal node. As described above, the value of the vote is equal to that of x. Therefore, the values of x and y are equal.

Q.E.D.

Lemma 6

When the number of Byzantine faults is equal to or smaller than b, and the elected vote x of a normal node is present, a vote of a normal node for a round subsequent to the next round is an elected vote, and input data thereof is equal to the input data of x.

Proof

The round of x is denoted by r. Based on Lemma 5, a vote of a normal node for the round r+1 is a to-be-elected vote, and the value thereof is equal to the value of x. In other words, all the values of the votes of the normal nodes for the round r+1 are equal. The following proves the vote y for the round r+2 is not a recommended vote by reduction to absurdity.

Reduction to Absurdity

Let us assume a case where the vote y for the round r+2 is a recommended vote. By denotes a set of votes for the round r+1 used for a confidential election in which y is determined. Because #(Ey)≥n−f is satisfied based on the definition of the algorithm, and the number of Byzantine faults is equal to or smaller than b, at least n−f−b of them are votes of normal nodes. As described above, all the votes are to-be-elected votes having the same value. Because f+2b+1≤n−f−b is satisfied based on Lemma 4, however, By includes f+2b+1 or more to-be-elected votes having the same value. This satisfies the condition for selecting an elected vote in a confidential election, which is inconsistent with the definition of the algorithm. Therefore, y cannot be a recommended vote. Because Y is not a recommended vote, it is an elected vote. The votes for the round r+1 of the confidential election in which y is determined include f+2b+1 or more votes having the same value as that of v. Because b+1f+2b+1 is satisfied, at least one of them is a vote of a normal node. As described above, the value of the vote is equal to that of x. Therefore, the values of x and y are equal.

Q.E.D.

Based on Lemma 2 and Lemma 6, all the elected votes of the normal nodes are the same input data even in different rounds when the number of Byzantine faults is equal to or smaller than b. In other words, given r is the first round in which a vote of a normal node is determined to be an elected vote, the votes of all the nodes are determined to be elected votes by the round r+2. The input data fixed by all the normal nodes are the same.

Data output from a node having a Byzantine fault may possibly be false data. If the determining unit 22 acquires an output packet, and the same output data are received from b+1 or more nodes, however, at least one of them is data output from a normal node. Therefore, the output data is proper.

As described above, the algorithm according to the present embodiment is proven to have a tolerance to a Byzantine fault and secure the consistency of multiplexing.

The following describes that the algorithm according to the present embodiment has no interruption of processing caused by time-out when a fault occurs (real-time property).

If n−f votes can be acquired, the algorithm according to the present embodiment advances the round. At this time, the algorithm has no concern about what kind of fault occurs in which node. In a case where the number of node faults is equal to or smaller than f, at least n-f votes can always be acquired even if a fault occurs at any timing. As a result, the algorithm advances the round.

The algorithm according to the present embodiment advances the round when n−f votes are acquired. In a case where the number of fault nodes is small, more than n−f votes may possibly be acquired. The algorithm, however, does not wait until the votes are acquired, thereby securing the real-time property. Specifically, the algorithm does not wait until all the nodes are acquired but advances the round when n-f votes are acquired, thereby performing multiplexing independently of fault detection. In a case where the algorithm need not have the real-time property, it may wait until votes of all the nodes are acquired before time-out, for example.

The number of rounds held until an elected vote is acquired is not uniform in the algorithm according to the present embodiment. This is because the algorithm has a part depending on random selection. If random selection is carried out with luck, the votes of the nodes become the same at an earlier stage, thereby providing an elected vote. If random selection is carried out with no luck, the votes of the nodes never become the same. In view of the probability, however, the possibility that an elected vote is never provided is almost zero. This is called probabilistic termination conditions.

The propriety of the algorithm remains the same even if the processing of "random" selection for a waiting vote and a recommended vote is literally performed randomly. The average number of rounds held until an election vote is provided, however, varies depending on the way of selection. When the round number is small, pseudorandom numbers may be adjusted by a heuristic method so as to facilitate the nodes' selecting the same input data. This adjustment significantly improves the efficiency of the algorithm. Practically, the use of such a heuristic method can make the average maximum round number approximately 4. If the selection of this way is completed fixed, however, the algorithm may possibly fail to be finished. For this reason, the random selection is not completely unnecessary for the algorithm.

Instead of randomly selecting a vote, the algorithm according to the present embodiment may select a vote in accordance with predetermined rules described below.

(1) A node given priority is determined in each round, and a vote of the node given priority is selected in the next election. The node given priority is changed every round. The node given priority is changed in order of the node number, for example.

(2) A vote having data of a small value is preferentially selected.

(3) Biased pseudorandom numbers are generated.

Second Embodiment

The first embodiment inputs and outputs data between the client device 20 and the multiplexing system (server device 10). A second embodiment inputs and outputs data between a multiplexing system α and a multiplexing system β. In other words, output data from the multiplexing system α corresponds to input data to the multiplexing system β.

Figure 6:
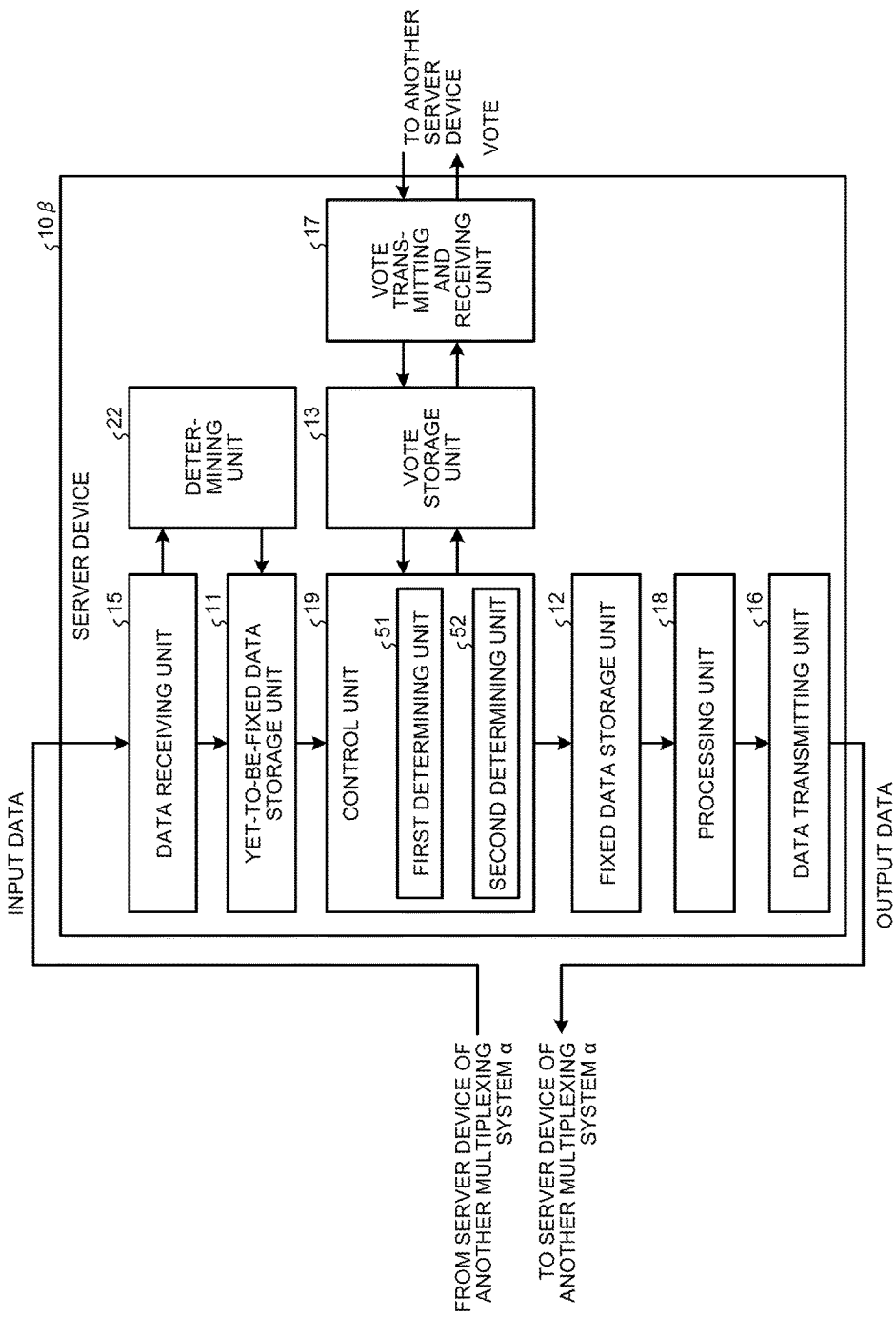
FIG. 6 is a block diagram of an exemplary configuration of a server device included in an information processing system according to a second embodiment.

FIG. 6 is a block diagram of an exemplary configuration of a server device 10β included in an information processing system according to the second embodiment. The server device 10β is included in the multiplexing system β serving as an information processing system. While one server device 10β alone is illustrated in FIG. 6, the number of server devices 10β may be a desired number as long as it is equal to or larger than four similarly to FIG. 1. The multiplexing system β is connected to the multiplexing system α having the same configuration.

The server device 10β is different from the server device 10 illustrated in FIG. 2 in that it further includes the determining unit 22. The other components and functions of the server device 10β are the same as those of the server device 10 according to the first embodiment illustrated in the block diagram in FIG. 2. The same components and functions are denoted by like reference numerals, and overlapping explanation thereof will be omitted.

As illustrated in FIG. 6, the determining unit 22 according to the present embodiment is provided to each of the server devices 10β of the multiplexing system β. Output packets output from the nodes (server devices 10α) of the multiplexing system α are received by the determining unit 22 via the data receiving unit 15. The determining unit 22 retains the output order number (present output order number) of output data to be subsequently fixed. When output packets having the same output data out of the output packets having the present output order number are received from bα+1 or more nodes, the determining unit 22 determines the output data to be input data. The determining unit 22 stores the input data in the yet-to-be-fixed data storage unit 11 and increments the present output order number by 1. The value bα is a threshold of reliability of the multiplexing system α. The other configuration is the same as that of the first embodiment.

With this configuration, the second embodiment assumed to be an asynchronous network model can perform the following multiplexing control in a case where data is input and output between multiplexing systems. If the number of computers having a Byzantine fault is equal to or smaller than b, valid output data acquired from the multiplexing system is proper. Furthermore, if the number of node faults is equal to or smaller than f, the multiplexing system can continue the processing.

Third Embodiment

There have been growing concerns about unauthorized access caused by cyberattacks. A matter of concern about cyberattacks on a distributed system is that any one vulnerable node may possibly allow unauthorized access, resulting in unauthorized access to the other nodes one after another. Generally speaking, as the number of nodes increases in a multiplexing system, the availability and the reliability of the system increases. As the number of nodes increases, however, the possibility of unauthorized access to a vulnerable node increases. In a case where the nodes mutually trust one another and have a configuration that allows unauthorized access to the nodes one after another, the security level is lowered on the contrary.

To increase a tolerance for the concerns described above, each node needs to independently ensure the security. Even if one of the nodes is taken over, the others need to be prevented from being readily infected. Specifically, the following measures are taken: a single password and a single secret key are not shared, setting of mutual trust is not made, a firewall is installed on each node, different operating systems (OS) and middleware are used, and an administrator and a vender are not fixed, for example.

On the assumption described above, a mechanism to prevent masquerading attacks is added to the embodiments above. With the mechanism, the multiplexing system can provide correct output data even if b nodes are taken over at the maximum. The following describes the multiplexing system.

The following three types of masquerading attacks are expected:

(1) input data is replaced by improper data.
(2) An output packet is replaced by improper data.
(3) A vote is replaced by improper data.

In a case where an attacker can freely falsify input data transmitted from the client device 20 and output data from a normal node, no correct result can be provided. Furthermore, in a case where an attacker can freely falsify a vote of a normal node, the propriety of the algorism readily collapses, resulting in no guarantee of a correct result.

The configuration of the present embodiment is as follows.

(A) The nodes and the client device 20 each have an individual secret key and keep the contents of the keys secret from one another.

(B) Public keys are distributed to the respective nodes and the client device 20 in advance.

(C) The client device 20 affixes a signature to input data with its secret key.

(D) When the nodes receive input data from the client device 20, they check the signature thereon and discard improper input data.

(E) The nodes affix a signature to a vote with their secret keys.

(F) When the nodes receive a vote from another node, they check the signature thereon, check the signature of the client device 20 on the input data included in the vote, and discard an improper vote.

(G) The nodes affix a signature to an output packet with their secret keys.

(H) When the client device 20 receives an output packet, it checks the signature thereon and discards an improper output packet.

An input packet, for example, has the following format: "input data and a signature affixed by the client device 20 to the input data".

A vote, for example, has the following format: "the order number, the round number, the node number, a selection result, input data, a signature affixed by the client device 20 to the input data, and a signature affixed by a node to the vote".

An output packet, for example, has the following format: "the order number, the node number, output data, and a signature affixed by a node to the packet".

These measures make the masquerading (1), (2), and (3) extremely difficult to perform, thereby increasing the tolerance to unauthorized access. This is because whether the data received from the client device 20 or a normal node is falsified can be determined based on the digital signatures. This mechanism can secure the validity of elections conducted in the algorithm according to the present embodiment.

The signatures, for example, are checked by a component that receives data (e.g., the vote transmitting and receiving unit 17 and the data receiving unit 15). Alternatively, the signatures may be checked by another component.

Because an attacker can transmit any improper vote from a node that allows unauthorized access, a normal node that receives it fails to exclude the false vote simply by checking the signatures. If the number of nodes that allow unauthorized access is equal to or smaller than b, however, the algorithm according to the present embodiment secures the propriety of output data.

The reason why the signature on the input data in the vote is also checked in the measure (F) is as follows. If the signature is not checked, the algorithm according to the present embodiment may possibly employ improper input data included in a vote transmitted from a node having a Byzantine fault as a waiting vote or a randomly selected recommended vote. As a result, the improper input data may possibly be selected as an elected vote in a subsequent round.

The signature on the input data is affixed by the client device 20, and a node having a Byzantine fault cannot falsify the signature of the client device 20. Consequently, the measure (F) is effectively used against improper input data.

If the nodes check the signature on the input data and discard improper input data at the entrance of the processing unit 18, the consistency is maintained without checking the signature on the input data in the processing (F). In this case, however, discard of the improper input data is delayed, resulting in significant deterioration in the efficiency of the algorithm caused by an attack.

To affix and check signatures, large calculation cost is typically required. Instead of affixing signatures to the votes and the output data and checking them, the nodes may transmit and receive data using communications that ensure security. The nodes, for example, may establish communications according to a protocol, such as secure sockets layer (SSL), with a communication partner (the client device 20 or another node) and transmit and receive data via the communications. This configuration requires lower calculation cost.

The following describes an application example of the mechanism described above to the second embodiment. The mechanism is different from that applied to the first embodiment in the way of affixing a signature to an output packet and the number of signatures affixed to input data. The multiplexing system $\alpha$ affixes a signature not to an output packet but to a "pair of the output order number of $\alpha$ and output data". The input data to the multiplexing system $\beta$ is the "pair of the output order number of $\alpha$ and output data". The input data is affixed with a plurality of signatures of the nodes in the multiplexing system $\alpha$. Given $b\alpha$ is the threshold of the reliability of the multiplexing system $\alpha$, the affixed signatures should be equal to or more than $b\alpha+1$. Note that all the signatures are different from one another because subjects that affix the signatures have different secret keys.

An output packet of the multiplexing system $\alpha$, for example, has the following format: "the output order number of $\alpha$, the node number, output data, and a signature affixed by a node to [the output order number of $\alpha$ and output data]".

A vote of the multiplexing system $\beta$, for example, has the following format: "the order number of $\beta$, the round number, the node number, a selection result, input data, a set of signatures affixed by the nodes of the multiplexing system $\alpha$ to the input data, and a signature affixed by a node to the vote".

Input data, for example, has the following format: [the output order number of a and output data].

If the number of output packets of a having the same output order number and output data affixed with a proper signature is equal to or larger than $b\alpha+1$, the determining unit 22 determines [the output order number of $\alpha$ and output data] to be input data and affixes a set of signatures to the input data. To check the signatures on the input data (measure (F)), the multiplexing system $\beta$ checks all the $b\alpha+1$ or more affixed signatures of the multiplexing system $\alpha$.

Also in the second embodiment, these measures make the masquerading (1), (2), and (3) extremely difficult to perform on a normal node, thereby increasing the tolerance to unauthorized access. To check the signatures on the input data in the measure (F), the multiplexing system $\beta$ checks all the $b\alpha+1$ or more affixed signatures of the multiplexing system $\alpha$. As a result, the multiplexing system $\beta$ excludes improper input data, thereby securing the tolerance to falsification of the input data.

Fourth Embodiment

The first embodiment advances the present round of the nodes only by elections. By adding an algorithm that copies a vote of another node, the execution efficiency of the algorithm can be increased.

Copy voting is processing for determining its own vote for a round from a set of votes of other nodes for the same round. By contrast, an election is processing for determining its own vote for the next round from a set of votes for the same round.

At least one of agreement copy, waiting copy, and recommendation copy is employed for the copy voting. The agreement copy may be performed by the first determining unit 51 and the second determining unit 52, for example. The waiting copy may be performed by the second determining unit 52, for example. The recommendation copy may be performed by the first determining unit 51, for example.

The agreement copy means voting, when votes from (b+1) or more nodes having the same "input data and selection result" are present in votes acquired for the same round, to the vote.

The waiting copy means voting, when waiting votes from (b+1) or more nodes are present, to a waiting vote of input data arbitrarily selected from the acquired votes. The votes from which the selection is made may be all the votes acquired from the other nodes or waiting votes acquired from the (b+1) or more nodes.

The recommendation copy means voting, when recommended votes from (2b+1) or more nodes are present, and the conditions for the agreement copy are not satisfied, a recommended vote of input data arbitrarily selected from the acquired votes. The votes from which the selection is made may be all the votes acquired from the other nodes or recommended votes acquired from the (2b+1) or more nodes.

If its own vote is already determined, no copy voting is performed in the round.

By carrying out the copy voting, the algorithm determines a vote for the same round with a smaller number of votes than that required by an election, thereby increasing the number of votes for the round. If the nodes carry out the copy voting, votes required for an election are eventually obtained. In other words, the copy voting itself does not advance the round, but it has advantageous effects to establish an election and advance the round.

Let us assume a case where an elected vote is present in the round r, for example. Based on the definition of the algorithm, f+2b+1 to-be-elected votes having the same value are present in a round r−1. At least 2b+1 votes out of the f+2b+1 to-be-elected votes are votes of operating nodes because the maximum number of node faults is f. All the votes are to-be-elected votes having the same value, which is sufficient for satisfying the conditions for the agreement copy in the round r−1.

Let us also assume a case where a to-be-elected vote is present in the round r, for example. Based on the definition of the algorithm, [(n+b)/2]+1 votes having the same value are present in the round r−1. At least 2b+1 votes out of the [(n+b)/2]+1 votes are votes of operating nodes because the maximum number of node faults is f and because f+2b+1 [(n+b)/2]+1 is satisfied based on Lemma 4. In the 2b+1 votes, b+1 or more elected votes or recommended votes are present. All the votes are to-be-elected votes having the same value, which is sufficient for satisfying the conditions for the agreement copy in the round r−1.

Let us also assume a case where a waiting vote is present in the round r, for example. Based on the definition of the algorithm, n−f votes are present in the round r−1. At least n−2f votes out of the n−f votes are votes of operating nodes because the maximum number of node faults is f. Because n>2f+3b is satisfied, n−2f≥3b+1 is satisfied. Therefore, b+1 or more elected votes or 2b+1 or more recommended votes are present. Because the operating nodes are normal nodes, the b+1 or more elected votes have the same value based on Lemma 2, which satisfies the conditions for the agreement copy. The 2b+1 or more recommended votes satisfy the first half of the conditions for the recommendation copy. In other words, this is sufficient for satisfying one of the recommendation copy and the agreement copy.

The following describes the validity of copy voting. Specifically, the following describes that the consistency of multiplexing is not broken by copy voting when the number of nodes having a Byzantine fault is equal to or smaller than b.

Let us assume a case where a vote x of a certain normal node is present. E is a set of votes acquired to determine the vote x. In the algorithm of an election, the acquired votes do not necessarily include a vote of its own node and are independent of the node number. E may possibly be identical with a set of votes acquired by another normal node. While a vote determined from E is not always identical with x because the algorithm has an element of random selection, it may possibly be identical with x because of random selection.

As a result, when the vote x of a certain normal node is present, a vote of another normal node may possibly have the same contents (input data and the selection result) as those of x. In other words, even if the contents of the vote x of the certain normal node is copied for another normal node, the consistency of multiplexing is not broken. If the consistency is broken, it is broken also in a case where the vote is determined not by copying but by an election, which is inconsistent with the definition of the algorithm. Needless to say, it is undesirable to simply copy a vote from a desired node. This is because the copy source may possibly be a node having a Byzantine fault. If votes having the same contents are acquired from b+1 nodes, however, at least one of them is a normal node. As a result, copying of a vote can be performed even if it is not known which node is a normal node (propriety of the agreement copy).

By contrast, input data for a waiting vote is always determined by random selection. When a waiting vote x of a certain normal node is present, a vote of another normal node may possibly be a waiting vote having desired input data. This is because a vote of a node having a Byzantine fault may possibly be selected by random selection. If waiting votes are acquired from b+1 nodes, at least one of them is a normal node. As a result, a waiting vote can be determined even if it is not known which node is a normal node (propriety of the waiting copy).

A recommended vote is determined by random selection or from b+1 or more to-be-elected votes. If recommended votes are acquired from 2b+1 nodes, at least b+1 of them are votes of normal nodes. If at least one of them is a recommended vote determined by random selection, a recommended vote of desired input data can be determined based on the same theory as that of the waiting vote (propriety of the recommendation copy). By contrast, if no recommended vote determined by random selection is present, all the input data of to-be-elected votes of normal nodes are the same based on Lemma 1, and thus all the input data of recommended votes determined therefrom are the same. As a result, the conditions for the agreement copy are satisfied. Note that the conditions for the recommendation copy include that the conditions for the agreement copy are not satisfied.

As described above, the validity of copy voting is proven.

The three types of copy voting are independently carried out. All the agreement copy, the waiting copy, and the recommendation copy may be applied, or any of them may be applied. The degree of improvement in the execution efficiency of the algorithm varies depending on the degree of application of the copy voting.

The thresholds of the waiting copy and the recommendation copy may be larger than the thresholds described above. While employment of larger thresholds hinders improvement in the execution efficiency of the algorithm by copying, it also reduces effects of a node having a Byzantine fault. Consequently, employment of larger thresholds is not necessarily bad for the algorithm.

As described above, the copy voting may be embodied in various forms relating to the execution efficiency of the algorithm. The modifications are included in design items and fall within the scope of the present invention.

Modification 1

The threshold of f+2b+1 for determining the elected state, the threshold of [(n+b)/2]+1 for determining the to-be-elected state, the threshold of b+1 for determining output data, and the threshold of 2b+1 of recommendation copy according to the embodiments above are generalized and denoted by t1, t2, t3, and t4, respectively. If t1, t2, t3, and t4 satisfy the following conditions, the algorithm remains valid.

$$f+2b+1 \leq t1 \leq n-f-b$$

$$[(n+b)/2]+1 \leq t2 \leq n-f-b$$

$$b+1 \leq t3 \leq n-f-b$$

$$2b+1 \leq t4 \leq n-f-b$$

Smaller thresholds improve the execution efficiency of the algorithm. Larger thresholds have an effect to increase the redundancy of the algorithm.

Modification 2

While the embodiments above use four types of states of the waiting state, the to-be-elected state, the recommended state, and the elected state, states defined by other methods may be used. The four types of states may be replaced as follows:

the recommended state is replaced by a recommended state in an odd-number-th round;

the waiting state is replaced by a recommended state in an even-number-th round;

the elected state is replaced by an elected state in an odd-number-th round; and the to-be-elected state is replaced by an elected state in an even-number-th round.

In this definition method, there are apparently two states of the recommended state and the elected state. The two states, however, are essentially the same as the four types of states according to the embodiments above and fall within the scope of the invention.

Figure 7:
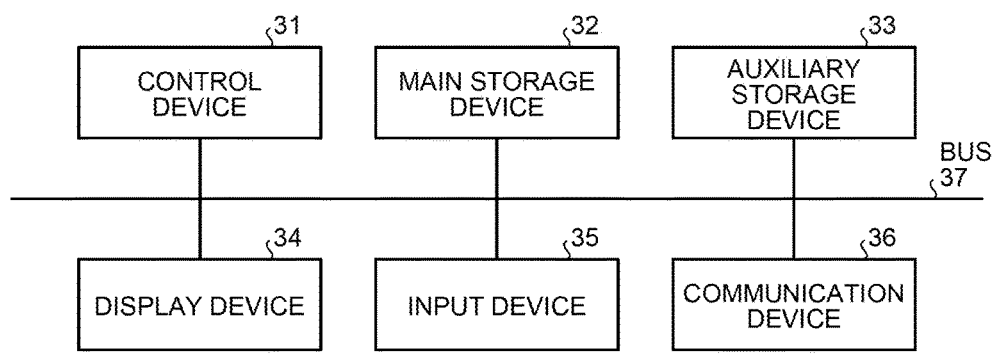
FIG. 7 is a diagram of an exemplary configuration of hardware of the devices according to the embodiments.

The following describes an example of a hardware configuration of the devices (the server device 10 and the client device 20) according to the embodiments above. FIG. 7 is a diagram of an exemplary configuration of hardware of the devices according to the embodiments above.

The devices according to the embodiments above each include a control device 31, a main storage device 32, an auxiliary storage device 33, a display device 34, an input device 35, and a communication device 36. The control device 31, the main storage device 32, the auxiliary storage device 33, the display device 34, the input device 35, and the communication device 36 are connected to one another via a bus 37.

The control device 31 executes a computer program read from the auxiliary storage device 33 to the main storage device 32. The main storage device 32 is a memory, such as a read only memory (ROM) and a RAM. The auxiliary storage device 33 is an HDD or a memory card, for example. The display device 34 is a screen that displays a state of the device and the like and is a liquid-crystal display, for example. The input device 35 is an interface used to operate the device and is a keyboard and a mouse, for example. The communication device 36 is an interface that connects the device to a network.

The computer program executed by the devices according to the embodiments above may be recorded in a computer-readable recording medium, such as a compact disc read only memory (CD-ROM), a memory card, a compact disc recordable (CD-R), and a digital versatile disc (DVD), as an installable or executable file and provided as a computer program product. The computer program executed by the devices according to the embodiments above may be stored in a computer connected to a network, such as the Internet, and provided by being downloaded via the network. The computer program executed by the devices according to the embodiments above may be provided or distributed via a network, such as the Internet, without being downloaded. The computer program executed by the devices according to the embodiments above may be embedded and provided in a ROM, for example.

The computer program executed by the server device 10 according to the embodiments above has a module configuration including a functional block that can be provided as a computer program out of functional blocks of the server device 10.

The computer program executed by the client device 20 according to the embodiments above has a module configuration including functional blocks of the client device 20.

In actual hardware, the control device 31 reads and executes the computer program from the storage medium to load each module on the main storage device 32. The modules thus are generated on the main storage device 32. Part or all of the functional blocks of the devices may be provided not by the computer program but by hardware, such as an integrated circuit (IC).

The embodiments above have described an example where votes are transmitted and received between a plurality of server devices 10. The embodiments above are also applicable to a personal computer, a virtual machine, a process on an OS, or the like besides the server device 10. Similarly, the client device 20 may be a personal computer, a virtual machine, a process on an OS, or the like. The network 30 may be a wide area network (WAN), such as the Internet, a virtual network, or inter-process communications (IPC), for example, besides a local area network (LAN).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multicasting system implementing an asynchronous network model on a system including n or more server devices (n is an integer satisfying n>2f+3b where f is an integer of 0 or larger and indicates a maximum permissible number of node faults, and b is an integer of 1 or larger and indicates a maximum permissible number of Byzantine faults), the information processing system comprising:
   a communications device networked with the n or more server devices using an asynchronous network;
   at least one storage configured to hold votes received using the communications device; and
   at least one processor configured to:
      initiate a first voting round with the n or more server devices using the communications device;
      receive, in response to the first voting round, at least one selection result selected for data from at least one of the server devices, the selection result indicating any one of a first fixed state, a first recommended state, and a second fixed state;
      store the received at least one selection result in the at least one storage with an indication of the first voting round;
      using votes in the at least one storage associated with the first voting round, conduct a preliminary election such that the second fixed state is selected for the data when a first condition is satisfied, the first condition indicating that t2 or more selection results indicating the first recommended state or the first fixed state are selected for the same data (t2 is an integer satisfying (n+b)/2<t2≤n−f−b);
      initiate a second voting round with the n or more server devices using the communications device;
      receive, in response to the second voting round, at least one selection result selected for data from at least one of the server devices;
      store the received at least one selection result in the at least one storage with an indication of the second voting round;
      using votes in the at least one storage associated with the second voting round, conduct a confidential election such that the first fixed state is selected for the data when a second condition is satisfied, the second condition indicating that t1 or more selection results indicating the second fixed state are selected for the same data (t1 is an integer satisfying f+2b+1≤t1≤n−f−b), and the first recommended state is selected for the data when a third condition is satisfied, the third condition indicating that the second condition is not satisfied and that (b+1) or more selection results indicating the second fixed state are selected for the same data; and
      when the data is in the first fixed state, process the data and output an output result;
   wherein the communications device is further configured to validate, when t3 or more same output results are received (t3 is an integer satisfying b+1≤t3≤n−f−b), the received output results as valid.

2. The multicasting system according to claim 1, wherein the at least one processor further receives a selection result indicating a second recommended state selected for data,
the preliminary election further includes an election such that the second recommended state is selected for one piece of data selected from the data for which the selection result is received when a fourth condition is satisfied, the fourth condition indicating that the first condition is not satisfied and that the selection result indicating the first recommended state or the first fixed state is received from (n−f) or more server devices, and
the confidential election further includes an election such that the first recommended state is selected for one piece of data selected from the data for which the selection result is received when a fifth condition is satisfied, the fifth condition indicating that neither the second condition nor the third condition is satisfied and that the selection result indicating the second recommended state or the second fixed state is received from (n−f) or more server devices.

3. The multicasting system according to claim 2, wherein the preliminary election includes an election such that the second recommended state is selected for one piece of data selected randomly or one piece of data selected in accordance with a predetermined rule when the first condition is not satisfied and the fourth condition is satisfied.

4. The multicasting system according to claim 2, wherein the confidential election includes an election such that the first recommended state is selected only when the fifth condition is satisfied.

5. The multicasting system according to claim 2, wherein the confidential election includes an election such that the first recommended state is selected for one piece of data selected randomly or one piece of data selected in accordance with a predetermined rule when neither the second condition nor the third condition is satisfied and the fifth condition is satisfied.

6. The multicasting system according to claim 1, wherein the preliminary election and the confidential election performed after the preliminary election are repeatedly performed until the first fixed state is selected.

7. The multicasting system according to claim 1, wherein the at least one processor determines whether the received selection result is proper based on a signature,
the at least one processor performs the preliminary election by using the selection result determined to be proper, and
the at least one processor performs the confidential election by using the selection result determined to be proper.

8. The multicasting system according to claim 7, wherein the at least one processor further receives data corresponding to the selection result and checks whether the received data is proper based on a signature,
the at least one processor further performs the preliminary election by using the selection result corresponding to the data determined to be proper, and
the at least one processor further performs the confidential election by using the selection result corresponding to the data determined to be proper.

9. The multicasting system according to claim 1, wherein the at least one processor further performs processing for selecting, when t3 or more selection results indicating the same state of the first recommended state or the first fixed state are received from other server devices for the same data, the same state for the data.

10. The multicasting system according to claim 1, wherein
the at least one processor further receives a selection result indicating a second recommended state selected for data, and
the at least one processor further performs processing for selecting, when t3 or more selection results indicating the same state of the second recommended state or the second fixed state are received from other server devices for the same data, the same state for the data.

11. The multicasting system according to claim 1, wherein
the at least one processor further receives a selection result indicating a second recommended state selected for data, and
the at least one processor further performs processing for selecting, when t3 or more selection results indicating the second recommended state are received from other server devices, the second recommended state for data selected arbitrarily.

12. The multicasting system according to claim 1, wherein the at least one processor further performs processing for selecting, when t4 or more selection results indicating the first recommended state are received from other server devices (t4 is an integer satisfying $2b+1 \le t4 \le n-f-b$), and t3 or more selection results indicating the first recommended state are not received from other server devices for the same data, the first recommended state for data selected arbitrarily.

13. A server device of a multicasting system implementing an asynchronous network model on a system including n or more server devices (n is an integer satisfying $n>2f+3b$ where f is an integer of 0 or larger and indicates a maximum permissible number of node faults, and b is an integer of 1 or larger and indicates a maximum permissible number of Byzantine faults), the server device comprising:
a communications device networked with the n or more server devices using an asynchronous network;
at least one storage configured to hold votes received using the communications device; and
at least one processor configured to:
initiate a first voting round with the n or more server devices using the communications device;
receive, in response to the first voting round, at least one selection result selected for data from at least one of the server devices, the selection result indicating any one of a first fixed state, a first recommended state, and a second fixed state;
store the received at least one selection result in the at least one storage with an indication of the first voting round;
using votes in the at least one storage associated with the first voting round, conduct a preliminary election such that the second fixed state is selected for the data when a first condition is satisfied, the first condition indicating that t2 or more selection results indicating the first recommended state or the first fixed state are selected for the same data (t2 is an integer satisfying $(n+b)/2 < t2 \le n-f-b$);
initiate a second voting round with the n or more server devices using the communications device;
receive, in response to the second voting round, at least one selection result selected for data from at least one of the server devices;
store the received at least one selection result in the at least one storage with an indication of the second voting round;
using votes in the at least one storage associated with the second voting round, conduct a confidential election such that the first fixed state is selected for the data when a second condition is satisfied, the second condition indicating that t1 or more selection results indicating the second fixed state are selected for the same data (t1 is an integer satisfying $f+2b+1 \le t1 \le n-f-b$) and the first recommended state is selected for the data when a third condition is satisfied, the third condition indicating that the second condition is not satisfied and that (b+1) or more selection results indicating the second fixed state are selected for the same data; and
when the data is in the first fixed state, process the data and output an output result.

14. An information processing method performed by a multicasting system implementing an asynchronous network model on a system including n or more server devices (n is an integer satisfying $n>2f+3b$ where f is an integer of 0 or larger and indicates a maximum permissible number of node faults, and b is an integer of 1 or larger and indicates a maximum permissible number of Byzantine faults), the information processing method comprising:

initiating a first voting round with the n or more server devices;

receiving, in response to the first voting round, at least one selection result selected for data from at least one of the server devices, the selection result indicating any one of a first fixed state, a first recommended state, and a second fixed state;

storing the received at least one selection result in at least one storage with an indication of the first voting round;

using votes in the at least one storage associated with the first voting round, conducting a preliminary election such that the second fixed state is selected for the data when a first condition is satisfied, the first condition indicating that t2 or more selection results indicating the first recommended state or the first fixed state are selected for the same data (t2 is an integer satisfying $(n+b)/2 < t2 \leq n-f-b$);

initiating a second voting round with the n or more server devices;

receiving, in response to the second voting round, at least one selection result selected for data from at least one of the server devices;

storing the received at least one selection result in the at least one storage with an indication of the second voting round;

using votes in the at least one storage associated with the second voting round, conducting a confidential election such that the first fixed state is selected for the data when a second condition is satisfied, the second condition indicating that t1 or more selection results indicating the second fixed state are selected for the same data (t1 is an integer satisfying $f+2b+1 \leq t1 \leq n-f-b$), and the first recommended state is selected for the data when a third condition is satisfied, the third condition indicating that the second condition is not satisfied and that (b+1) or more selection results indicating the second fixed state are selected for the same data;

when the data is in the first fixed state, processing the data and outputting an output result; and validating, when t3 or more same output results are received (t3 is an integer satisfying $b+1 \leq t3 \leq n-f-b$), the received output results as valid.

15. A computer program product having a non-transitory computer readable medium including programmed instructions, wherein the instructions, when executed by a computer included in a server device of a multicasting system implementing an asynchronous network model on a system including n or more server devices (n an integer satisfying $n > 2f+3b$ where f is an integer of 0 or larger and indicates a maximum permissible number of node faults, and b is an integer of 1 or larger and indicates a maximum permissible number of Byzantine faults), cause the computer to perform:

initiating a first voting round with the n or more server devices;

receiving, in response to the first voting round, at least one selection result selected for data from at least one of the server devices, the selection result indicating any one of a first fixed state, a first recommended state, and a second fixed state;

storing the received at least one selection result in at least one storage with an indication of the first voting round;

using votes in the at least one storage associated with the first voting round, conducting a preliminary election such that the second fixed state is selected for the data when a first condition is satisfied, the first condition indicating that t2 or more selection results indicating the first recommended state or the first fixed state are selected for the same data (t2 is an integer satisfying $(n+b)/2 < t2 \leq n-f-b$);

initiating a second voting round with the n or more server devices;

receiving, in response to the second voting round, at least one selection result selected for data from at least one of the server devices;

storing the received at least one selection result in the at least one storage with an indication of the second voting round;

using votes in the at least one storage associated with the second voting round, conducting a confidential election such that the first fixed state is selected for the data when a second condition is satisfied, the second condition indicating that t1 or more selection results indicating the second fixed state are selected for the same data (t1 is an integer satisfying $f+2b+1 \leq t1 \leq n-f-b$)and the first recommended state is selected for the data when a third condition is satisfied, the third condition indicating that the second condition is not satisfied and that (b+1) or more selection results indicating the second fixed state are selected for the same data; and when the data is in the first fixed state, processing the data and outputting an output result.

* * * * *